(12) United States Patent
Kubo et al.

(10) Patent No.: US 9,669,504 B2
(45) Date of Patent: Jun. 6, 2017

(54) WORKPIECE MACHINING METHOD

(71) Applicant: HONDA MOTOR CO., LTD., Tokyo (JP)

(72) Inventors: Masakazu Kubo, Tochigi (JP); Taro Nakamura, Tochigi (JP); Masaichi Ohno, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/640,436

(22) Filed: Mar. 6, 2015

(65) Prior Publication Data

US 2015/0258648 A1    Sep. 17, 2015

(30) Foreign Application Priority Data

Mar. 14, 2014   (JP) .................................. 2014-052233

(51) Int. Cl.
  *B23Q 1/66*    (2006.01)
  *B23Q 3/06*    (2006.01)
  *B23Q 1/52*    (2006.01)
  *B23Q 39/02*   (2006.01)

(52) U.S. Cl.
  CPC .............. *B23Q 1/66* (2013.01); *B23Q 1/525* (2013.01); *B23Q 3/061* (2013.01); *B23Q 39/023* (2013.01); *B23Q 39/028* (2013.01); *Y10T 29/49998* (2015.01)

(58) Field of Classification Search
  CPC . Y10T 409/306048; Y10T 409/306104; Y10T 409/30532; Y10T 409/305432; Y10T 29/5196; Y10T 29/5124; B23Q 1/525; B23Q 3/061; B23Q 16/00
  See application file for complete search history.

(56) References Cited

U.S. PATENT DOCUMENTS

2007/0209185 A1*  9/2007  Huang .................... B23P 13/02
                                                          29/38 R

FOREIGN PATENT DOCUMENTS

JP      2011-240466      12/2011

* cited by examiner

*Primary Examiner* — Sarang Afzali
*Assistant Examiner* — Ruth G Hidalgo-Hernandez
(74) *Attorney, Agent, or Firm* — Rankin, Hill & Clark LLP

(57) ABSTRACT

A workpiece machining jig includes: a base member of an H cross-sectional shape integrally having two vertical flanges and a web having an interior hollow portion and extending horizontally to connect between the vertical flanges; first and second pallets fixed to the opposite surfaces of the web for placing thereon four workpieces, two workpieces on each of the pallets, in a horizontal posture. Each of the pallets has a pallet-side communication hole communicating to the hollow portion, and each of the flanges has a flange-side communication hole communicating to the hollow portion. The pallet-side communication hole of each of the pallets and the flange-side communication hole of a corresponding one of the flanges are interconnected by a tube extending in the hollow portion. Thus, four workpieces are machined concurrently using the single workpiece machining jig.

1 Claim, 10 Drawing Sheets

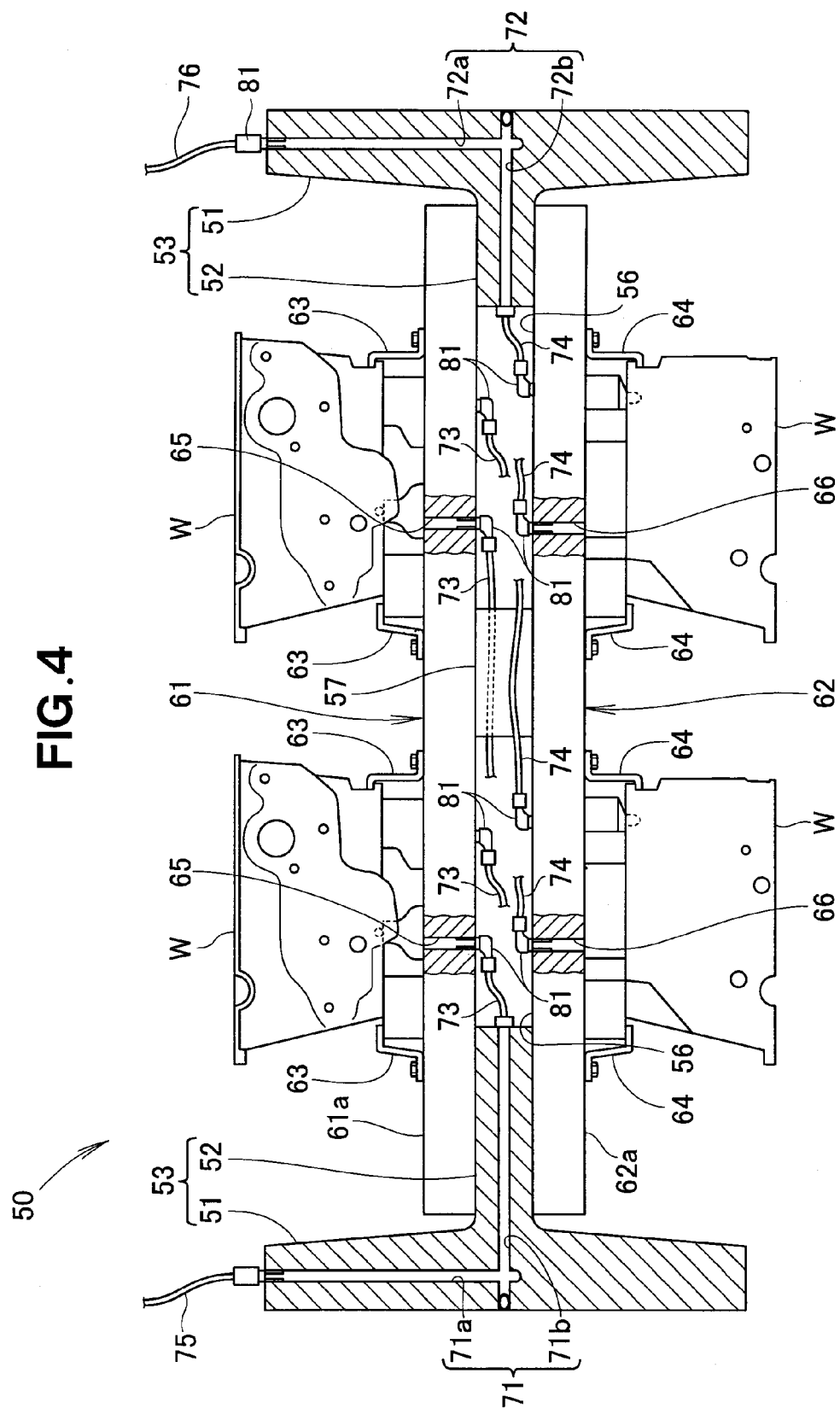

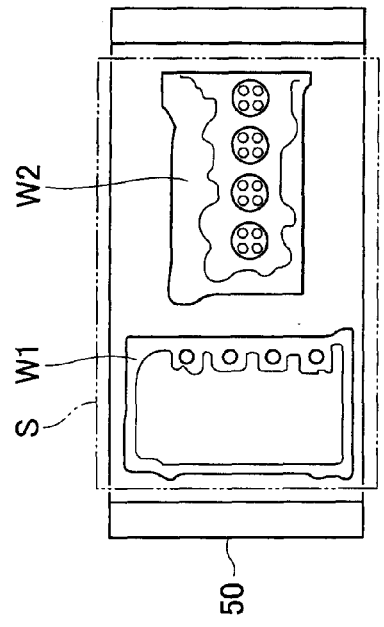
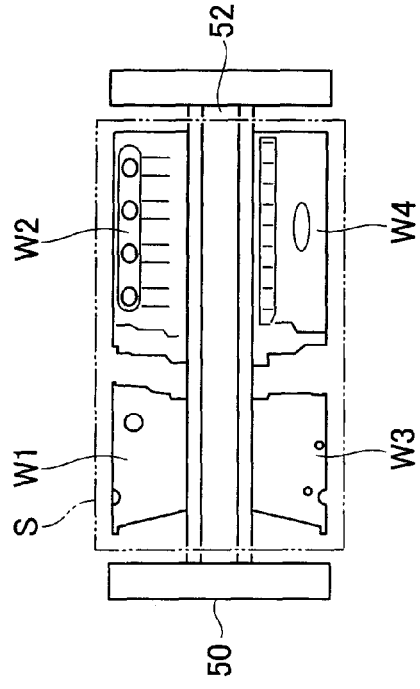
FIG.5A  FIG.5B
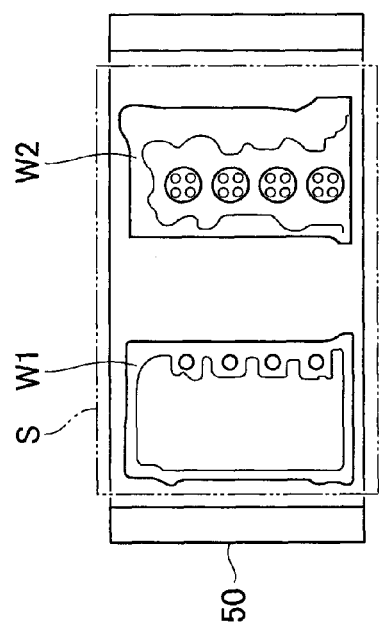
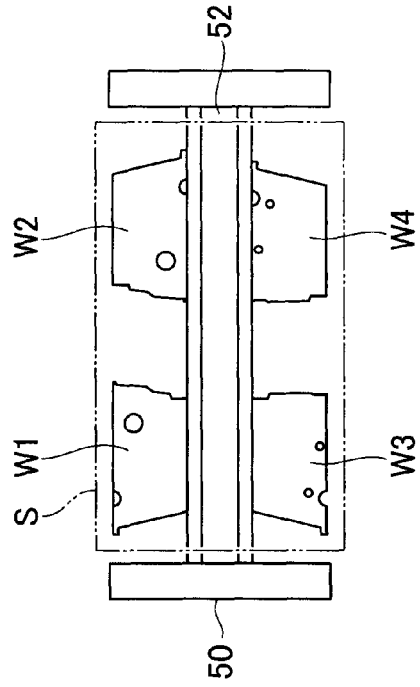
FIG.5C  FIG.5D

WORKPIECE MACHINING METHOD

FIELD OF THE INVENTION

The present invention relates to a workpiece machining technique for machining workpieces by means of a multi-axis machining machine.

BACKGROUND OF THE INVENTION

Multi-axis machining machines have heretofore been known which machine workpieces, such as cylinder heads and cylinder blocks of engines and transmission cases, by means of a multi-axis tool called a gang head. One example of such multi-axis machining machines is disclosed in Japanese Patent Application Laid-open publication No. 2011-240466 (hereinafter referred to as "the relevant patent literature").

As shown in FIG. 10, a machining apparatus 100 disclosed in the relevant patent literature includes a clamp unit 102 for positioning and clamping two workpieces 101, and a machining unit 103 for machining the clamped workpieces 101. The clamp unit 102 includes a vertical wall 105 projecting upward from a central portion of a turntable 104, and two workpieces 101 are clamped by two pallets 106 provided on opposite surfaces of the vertical wall 105, one workpiece 101 by each of the pallets 106. The machining unit 103 includes a plurality of multi-axis tools 108 provided on an index device 107, and the workpieces 101 clamped by the pallets 106 are machined by these multi-axis tools 108.

The workpieces 101 each have a plurality of machining surfaces (i.e., surfaces to be machined), and the turntable 104 is turned through 90 degrees as necessary to change respective angles of the workpieces 101 relative to the multi-axis tools 108, so that the plurality of machining surfaces of each of the workpieces 101 can be machined. For example, after only one of the workpiece 101 is machined, the turntable 104 is turned through 90 degrees so that respective side surfaces of the two workpieces 101 are opposed to the multi-axis tool 108, and then, the two workpieces 101 are machined concurrently.

If a plurality of workpieces 101 can be machined concurrently, an enhanced machining efficiency can be achieved. Specifically, if two workpieces 101 are placed or positioned on each of the two pallets 106, then a four workpieces can be machined concurrently, so that the machining efficiency can be enhanced.

According to the technique disclosed in the relevant patent literature, however, because the workpieces 101 are oriented vertically on the clamp unit 102, it is difficult to place or position two workpieces 101 vertically on each of the pallets 106, and thus, only up to two workpieces 101 can be machined concurrently. Further, because the workpieces 101 transferred to the clamp unit 102 in a horizontal posture by a workpiece transfer device have to be mounted on a jig (comprising the pallets 106 and the vertical wall 105) after being changed from the horizontal posture to a vertical posture, the workpiece transfer device tends to be complex in construction and costly. Thus, in order to machine different surfaces of the workpieces 101, the work pieces have to be repositioned on other different jigs, which results in a poor production efficiency or productivity. Therefore, more improvement is to be made in order to enhance the productivity.

Further, because each of the multi-axis tools 108 has a predetermined machining range, it is necessary to position many workpieces 101 within the machining range. If it is desired to simply place many, e.g. four, workpieces 101 on the turntable 104, the jig (comprising the pallets 106 and the vertical wall 105) has to be reduced in thickness in order to position all of the four workpieces 101 within the machining range. As the number of workpieces 101 increases, the number of cutting oil and air feed ports must increase. However, with the pallets 106 and the vertical wall 105 reduced in thickness, it is difficult to increase the number of cutting oil and air feed ports on the thickness-reduced pallets and vertical wall, but also it is difficult for the thickness-reduced pallets and vertical wall to have sufficient rigidity to support the four workpieces 101.

SUMMARY OF THE INVENTION

In view of the foregoing prior art problems, it is an object of the present invention to provide an improved technique which can mount or position (place) four workpieces on a workpiece machining jig in a horizontal posture and can machine the four workpieces concurrently using the single workpiece machining jig.

In order to accomplish the above-mentioned object, the present invention provides an improved workpiece machining method for machining four workpieces by means of a multi-axis machining machine, which comprises: a clamp step of positioning the four work pieces on a horizontal pallet, two workpieces of the four workpieces on one of the opposite surfaces of the pallet and other two workpieces of the four workpieces on the other of the opposite surfaces, with the opposite surfaces oriented upward and downward respectively, and clamping all of the workpieces in such a manner that all of the four workpieces are opposed to the multi-axis machining machine; a first machining step of machining respective surfaces, currently opposed to the multi-axis machining machine, of the four workpieces; a second machining step of rotating the pallet through 90 degrees so that the two workpieces positioned on the one surface of the pallet are opposed to the multi-axis machining machine, and machining respective surfaces, currently opposed to the multi-axis machining machine, of the two workpieces positioned on the one surface of the pallet; a third step of further rotating the pallet through 90 degrees and machining respective surfaces, currently opposed to the multi-axis machining machine, of the four workpiece; a fourth step of further rotating the pallet through 90 degrees so that the two workpieces positioned on the other surface of the pallet are opposed to the multi-axis machining machine, and machining respective surfaces, currently opposed to the multi-axis machining machine, of the two workpieces positioned on the other surface of the pallet; and a workpiece replacement step of further rotating the pallet through 90 degrees and causing a transfer device to unload one of the two workpieces positioned on the one surface of the pallet, move the other of the two workpieces on the one surface to a position on which the one of the workpieces on the one surface has previously been positioned so that the other of the two workpieces on the one surface of the pallet is placed at a surface thereof parallel to the pallet, and position a new workpiece on a position on which the other of the two workpieces has previously been positioned. Four workpieces are machined concurrently by repetition of the clamp step, the first machining step, the second machining step, the third machining step, the fourth machining step and the workpiece replacement step.

According to the present invention, two workpieces of the four workpieces are positioned on the one surface of the horizontal pallet and other two workpieces of the four workpieces are positioned on the other surface of the horizontal pallet, with the opposite surfaces oriented upward and downward respectively. Because the workpieces are positioned on the horizontal pallet, the workpieces can be readily placed on the pallet (workpiece machining jig) in the same horizontal posture as when they were transferred by the transfer device, as compared to the case where the workpieces transferred in the horizontal posture by the transfer device are clamped on the pallet after being changed to a vertical posture. As a result, the transfer device employed in the present invention can be simplified in construction and reduced in cost. In addition, because different surfaces of the workpieces can be readily machined using the one and same workpiece machining jig, the present invention can achieve an enhanced productivity and reduce the necessary cost of the jig, as compared to the case where the workpieces are repositioned on other different jigs for machining of different surfaces of the workpieces. Further, because four workpieces can be machined concurrently by the first to fourth steps, the present invention can achieve an enhanced machining efficiency.

According to another aspect of the present invention, there is provided an improved workpiece machining jig for positioning (or placing) thereon four workpieces in such a manner that the four workpieces are opposed to a multi-axis machining machine for machining the four workpieces concurrently, which comprises: a base member of a generally H cross-sectional shape integrally having two opposed vertical flanges and a web extending horizontally to connect between the vertical flanges; a first pallet fixed to one of two opposite surfaces of the web; and a second pallet fixed to the other of the two opposite surfaces of the web. Two of the four workpieces are positioned on the first pallet while the other two of the four workpieces are positioned on the second pallet, the first pallet and the second pallet have a greater rigidity than the base member. Because the first pallet and the second pallet have a greater rigidity than the base member, sufficient rigidity for mounting thereon the four workpieces can be secured even if the base member is reduced in thickness. In addition, with the thickness-reduced base member, the four workpieces mounted on the workpiece machining jig can be located within a predetermined machining range and thus can be machined concurrently.

Preferably, the web has an interior hollow portion, each of the first pallet and the second pallet has a pallet-side communication hole formed therethrough to communicate from a workpiece placement surface thereof to the interior hollow portion of the web, each of the flanges has a flange-side communication hole formed therethrough to communicate from the outside to the interior hollow portion, and the pallet-side communication hole of each of the first pallet and the second pallet and the flange-side communication hole of a corresponding one of the flanges are interconnected by a tube extending in the interior hollow portion. Because the tube interconnecting the pallet-side communication hole of each of the first pallet and the flange-side communication hole of the corresponding flange extends in the interior hollow portion, cutting oil and air can be fed to a multiplicity of workpieces by interconnecting such tubes. As a result, the present invention can eliminate a need for forming many feed ports in the web.

Preferably, a solid portion is provided in a middle region of the web and partitions the interior hollow portion into two parts located adjacent to corresponding ones of the flanges. The solid portion provided in the middle region of the web can significantly increase the rigidity of the web.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4 is a sectional view taken along line 4-4 of FIG. 2;

FIGS. 5A to 5D are views explanatory of a machining range of a multi-axis machining machine employed in the machining apparatus;

DETAILED DESCRIPTION OF THE INVENTION

Figure 1:
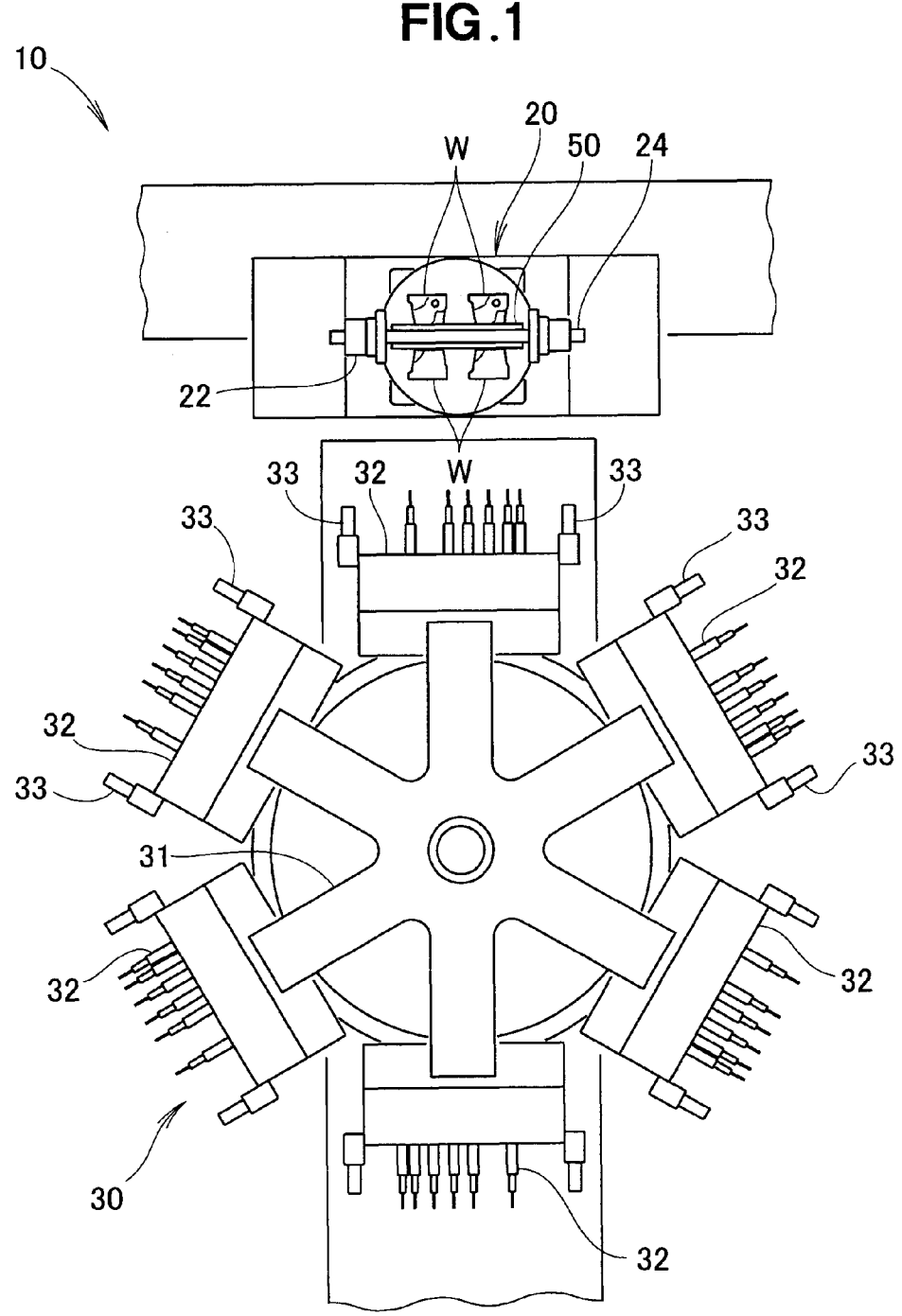
FIG. 1 is a plan view of a machining apparatus for use with an embodiment of a workpiece machining method of the present invention.

FIG. 1 is a plan view of a machining apparatus 10 for use with an embodiment of a workpiece machining method of the present invention. As shown, the machining apparatus 10 includes a clamp device 20 capable of positioning and clamping four workpieces W, and a multi-axis machining machine 30 for machining the workpieces W clamped by the clamp device 20. The clamp device 20 and the multi-axis machining machine 30 are controlled so that machining is sequentially performed on the workpieces W.

The clamp device 20 is disposed in opposed relation to the multi-axis machining machine 30. The multi-axis machining machine 30 includes a plurality of multi-axis tools 32, called gang heads, provided on an index mechanism 31. The workpieces W are machined via any one of the multi-axis tools 32 by the machining machine 30 being advanced toward the clamp device 20 by means of a not-shown advance means.

Guide rods 33 are provided on each of the multi-axis tools 32. As the multi-axis tool 32 is advanced toward the clamp device 20, the guide rods 33 of the multi-axis tool 32 are fitted into guide holes 27 (see FIG. 2) formed in the clamp device 20 so that the multi-axis tool 32 is positioned relative to the clamp device 20.

Figure 2:
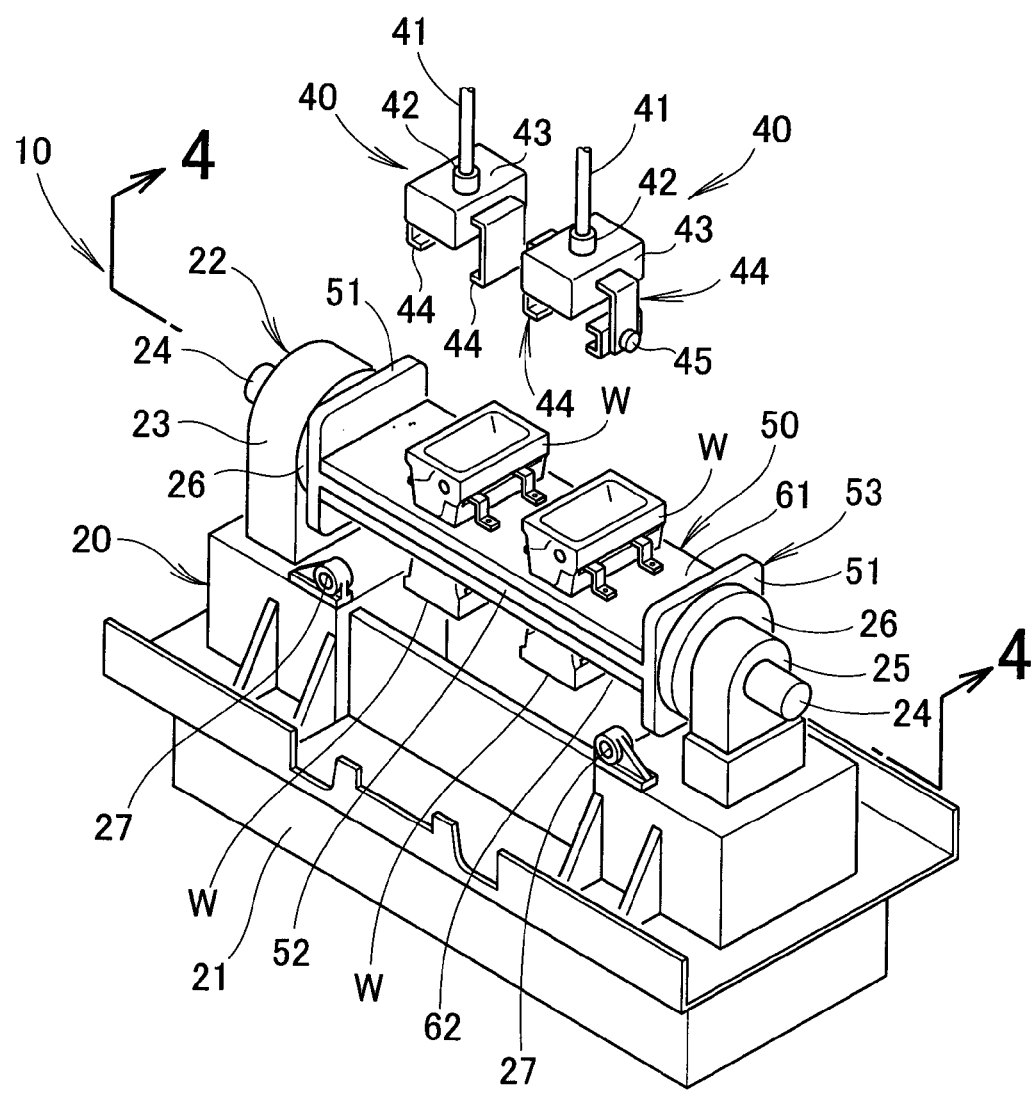
FIG. 2 is a perspective view of a clamp device and a transfer device employed in the machining apparatus.

As shown in FIG. 2, the transfer devices 40 are provided above the clamp device 20. Each of the transfer devices 40 includes: a support bar 41 provided on a not-shown rail for movement therealong; a horizontally turning mechanism 42 connected to the support bar 41; an opening/closing mechanism 43 connected to the horizontal rotation mechanism 42; and two arm sections 44 connected to the opening/closing mechanism 43.

The arm sections 44 are openable and closable by the opening/closing mechanism 43, and the workpiece W can be retained by opening and closing movement of the arm sections 44 and horizontally turned or rotated by the horizontally turning mechanism 42. Note that vertically turning mechanisms 45 may be provided on the arm sections 44 so that the workpiece W can be turned or rotated vertically or along a vertical plane.

The clamp device 20 includes a support table 21, a rotation unit 22 provided on the support table 21, and a workpiece machining jig 50 rotatably connected with the rotation unit 22. The rotation unit 22 includes: a rotation drive section 23 for producing rotating force; a rotation shaft 24 connected to the rotation drive section 23; a supporting the rotation shaft 24 and drivable by the rotation shaft 24; and support plates 26 mounted on the rotation shaft 24 and supporting the workpiece machining jig 50. Further, the guide holes 27 into which the guide rods 33 can be fit are formed in the support table 21.

Figure 3:
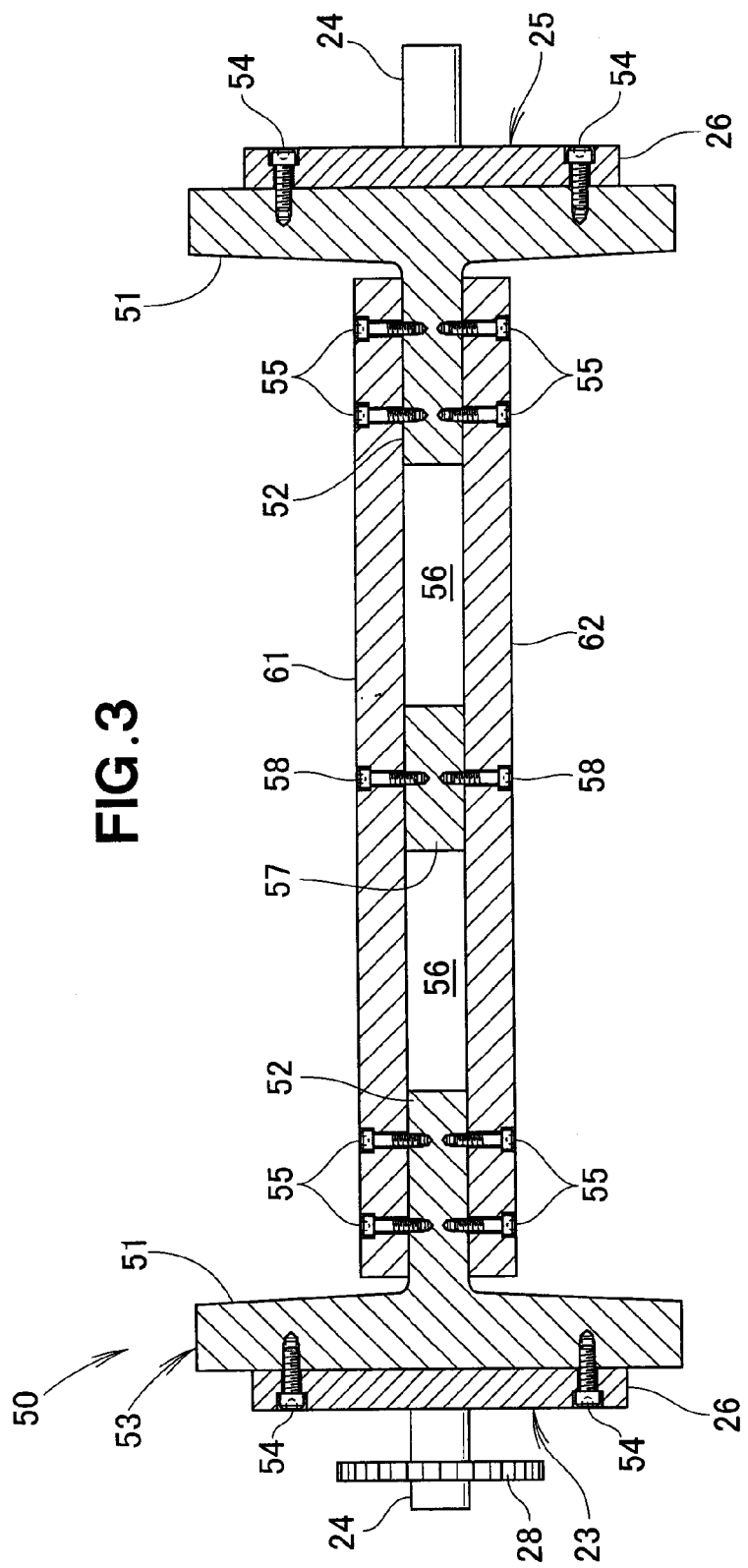
FIG. 3 is a sectional view of an embodiment of a workpiece machining jig employed in the machining apparatus.

As shown in FIGS. 2 and 3, the workpiece machining jig 50 includes a base member 53 of a generally H cross-sectional shape integrally having two opposed flanges 51 extending vertically upward and a horizontal web 52 extending horizontally to connect between the flanges 51, and first and second pallets 61 and 62 fixed to the opposite surfaces of the horizontal web 52. The flanges 51 are fastened to the support plates 26 by means of bolts 54. The web 52 horizontally extends between and connected to the two flanges 52, and the first pallet 61 is fastened to one of the surfaces of the web 52 by means of bolts 55 while the second pallet 62 is fastened to the other surface of the web 52 by means of bolts 55.

Further, the web 52 has an interior hollow portion partitioned into two interior hollow portions 56 by a solid portion 57 provided in a middle region of the web 52. These hollow portions 56 are located adjacent to the two flanges 51. The solid portion 57 is fastened to the first and second pallets 61 and 62 by means of bolts 58. Because the solid portion 57 is provided in the middle region of the web 52, the base member 53 has an increased overall rigidity.

A gear 28 is provided integrally on a portion of the rotation shaft 24 adjacent to the rotation drive section 23, and the first and second pallets 61 and 62 can be rotated by the gear 28 being rotated by driving force transmitted from a not-shown drive source.

As shown in FIG. 4, two workpieces W are clamped on the first pallet 61 by means of retainers 64, and two other workpieces W are clamped on the second pallet 62 by means of other retainers 64. These four workpieces W are positioned relative to the first and second pallets 62 by means of not-shown positioning pins.

The first and second pallets 62 have a greater rigidity than the base member 53. Thus, even where the web 52 of the base member 53 is reduced in thickness, the first and second pallets 62 supplement rigidity necessary to retain the four workpieces W on the workpiece machining jig 50.

The first pallet 61 has a plurality of first pallet-side communication holes 65 formed therethrough to communicate from a workpiece placement surface 61a to the interior hollow portion 56. The second pallet 62 has a plurality of second pallet-side communication holes 66 formed therethrough to communicate from a workpiece placement surface 62a to the interior hollow portion 56.

The base member 53 has a plurality of first flange-side communication holes 71 and a plurality of second flange-side communication holes 72 extending from the outside to the interior hollow portion 56. Each of the first flange-side communication holes 71 shown on the left side of the figure comprises a vertical flange-side communication hole 71a formed in one of the flanges 51 and a horizontal flange-side communication hole 71b formed in the web 52, and each of the second flange-side communication holes 72 shown on the right side of the figure comprises a vertical flange-side communication hole 72a formed in the other flange 51 and a horizontal flange-side communication hole 72b formed in the web 52. Although the first pallet-side communication holes 65, second pallet side communication holes 66, first flange-side communication holes 71 and second flange-side communication holes 72 are provided in corresponding relation to the workpieces W to be retained on the first and second pallets 61 and 62, only one such holes 65, 66, 71 and 72 will be described for convenience.

The first pallet-side communication hole 65 and the first flange-side communication hole 71 are interconnected by a tube 73 extending in the interior follow portion 56. Similarly, the second pallet-side communication hole 66 and the second flange-side communication hole 72 are interconnected by a tube 74 extending in the interior follow portion 56.

The tube 73 connects the first flange-side communication hole 71 shown in a left side region of the figure to the first pallet-side communication hole 65 formed in the first pallet 61 disposed above the second pallet 62 in the figure. The tube 74 connects the second flange-side communication hole 72 shown in a right side region of the figure to the second pallet-side communication hole 66 formed in the second pallet 62 disposed beneath the first pallet 61 in the figure. By feeding cutting oil and air to each of the workpieces W through the hole 71 or 72 formed in the same flange 51, the number of feed port systems required in the machining apparatus can be significantly reduced.

Further, tubes 75 and 76 for introducing cutting oil and air from the outside and the tubes 73 and 74 extending in the hollow portion 56 are connected to the flanges 51, web 52 and pallets 61 and 62, respectively, via joints.

The following describe a machining range. As shown in FIG. 5A, two workpieces W1 and W2, each having a rectangular shape as viewed in front elevation, are positioned with their long sides oriented in the vertical direction and are positioned within the machining range S.

FIG. 5B shows the workpiece machining jig 50 rotated through 90 degrees from the position shown in FIG. 5A. As shown in FIG. 5B, other two workpieces W3 and W4 are positioned on a side of the workpiece machining jig 50 opposite from the workpieces W1 and W2, and all of these four workpieces W1 to W4 are located within the machining range S as viewed in front elevation.

In FIG. 5C, the two workpieces W1 and W2 are positioned with the long side of one of the workpieces W1 oriented in the vertical direction and with the long side of the other workpiece W2 oriented in a horizontal direction, and these workpieces W1 and W2 are located within the machining range S.

Figure 10:
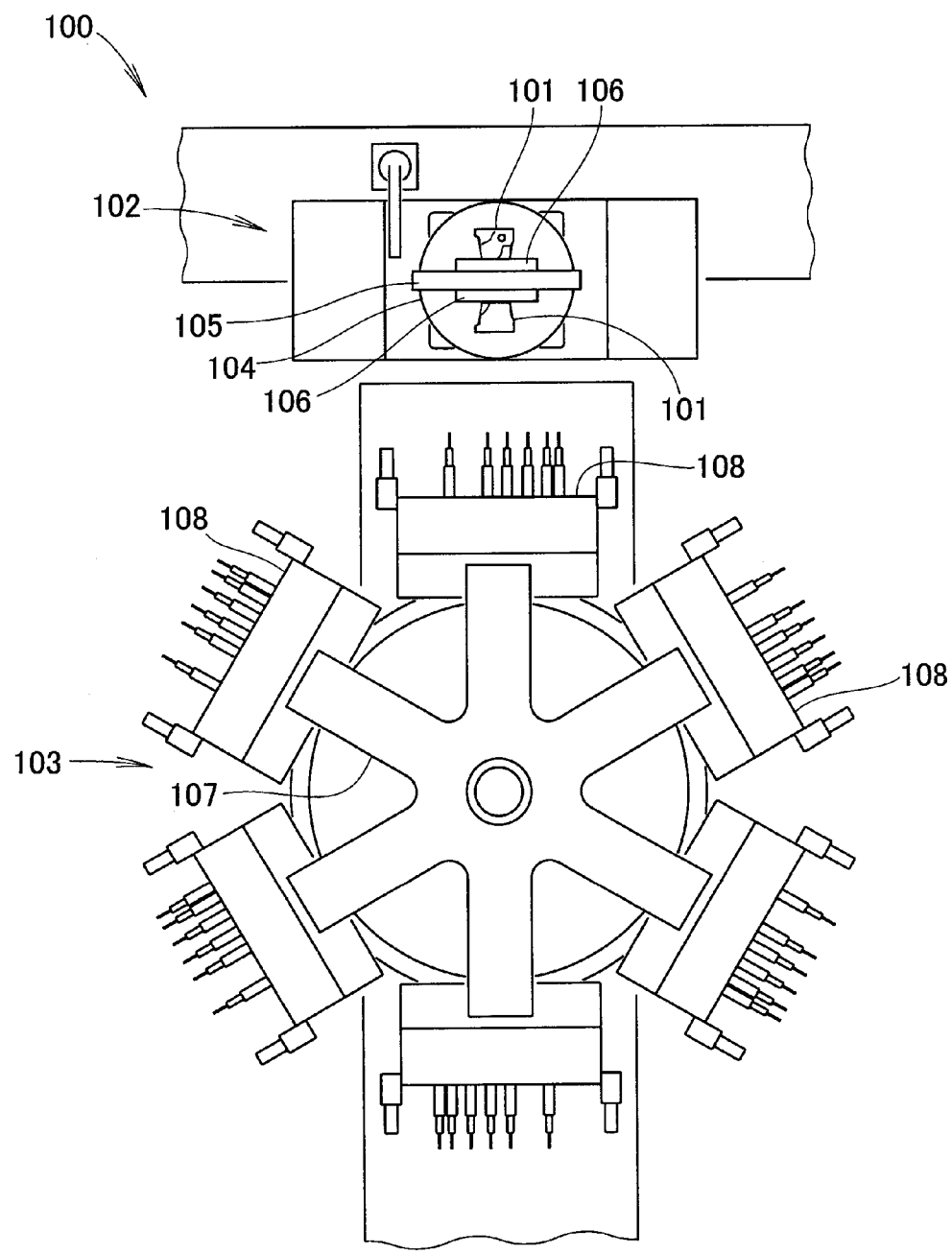
FIG. 10 is a view illustrating the basic principles of a conventional machining apparatus.

FIG. 5D shows the workpiece machining jig 50 rotated through 90 degrees from the position shown in FIG. 5C. As shown in FIG. 5D, the other two workpieces W3 and W4 are positioned on the side of the workpiece machining jig 50 opposite from the workpiece W2, and all of these four workpieces W1 to W4 are located within the machining range S as viewed in front elevation. Because the present invention can reduce the thickness of the web 52 as compared to the prior art shown in FIG. 10, all of the four workpieces W1 to W4 can be located within the machining range S.

Figure 6A:
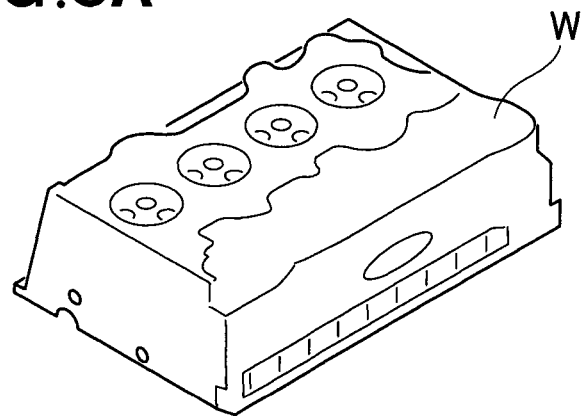
FIGS. 6A and 6B are views explanatory of an example detail of a workpiece.
Figure 6B:
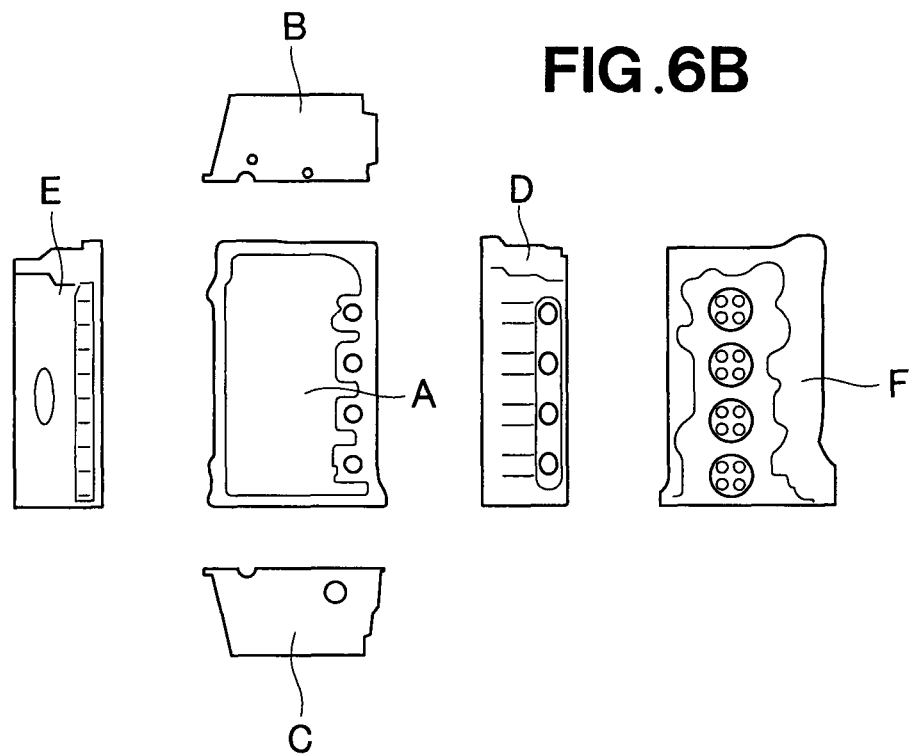

The following describe an example detail of the workpiece W. As shown in FIG. 6A, the workpiece W is a cylinder head of an engine. Further, as shown in FIG. 6B, the workpiece W has six machining surfaces, i.e. first to six surfaces A to F. Whereas the workpiece W will hereinafter be described as a cylinder head, the present invention should not be construed as so limited, and the workpiece W may be another ordinary mechanical part, such as a cylinder head cover or a cylinder block.

Figure 7:
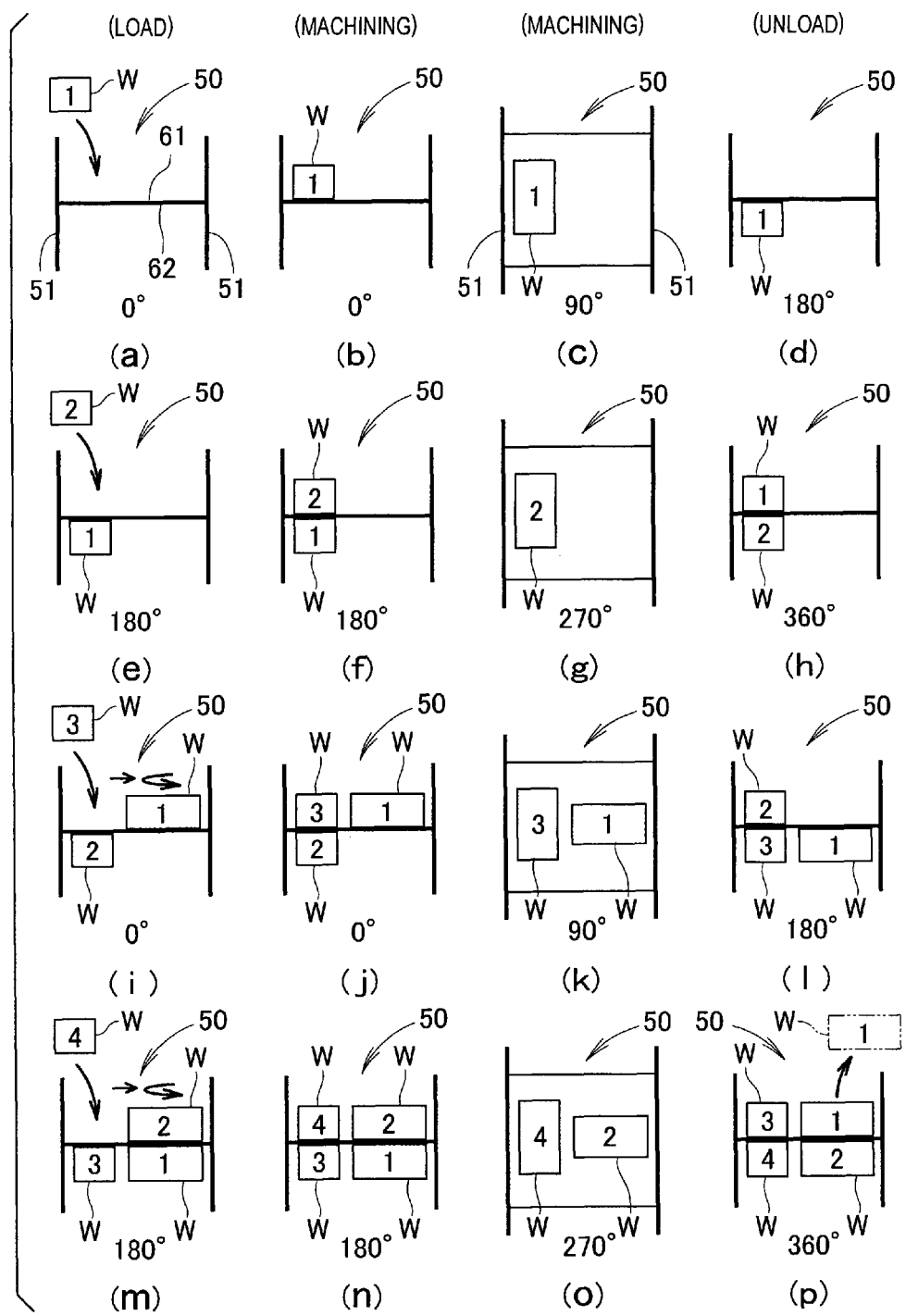
FIG. 7 is a view of a clamp step to a second step performed in the embodiment of the present invention.
Figure 8:
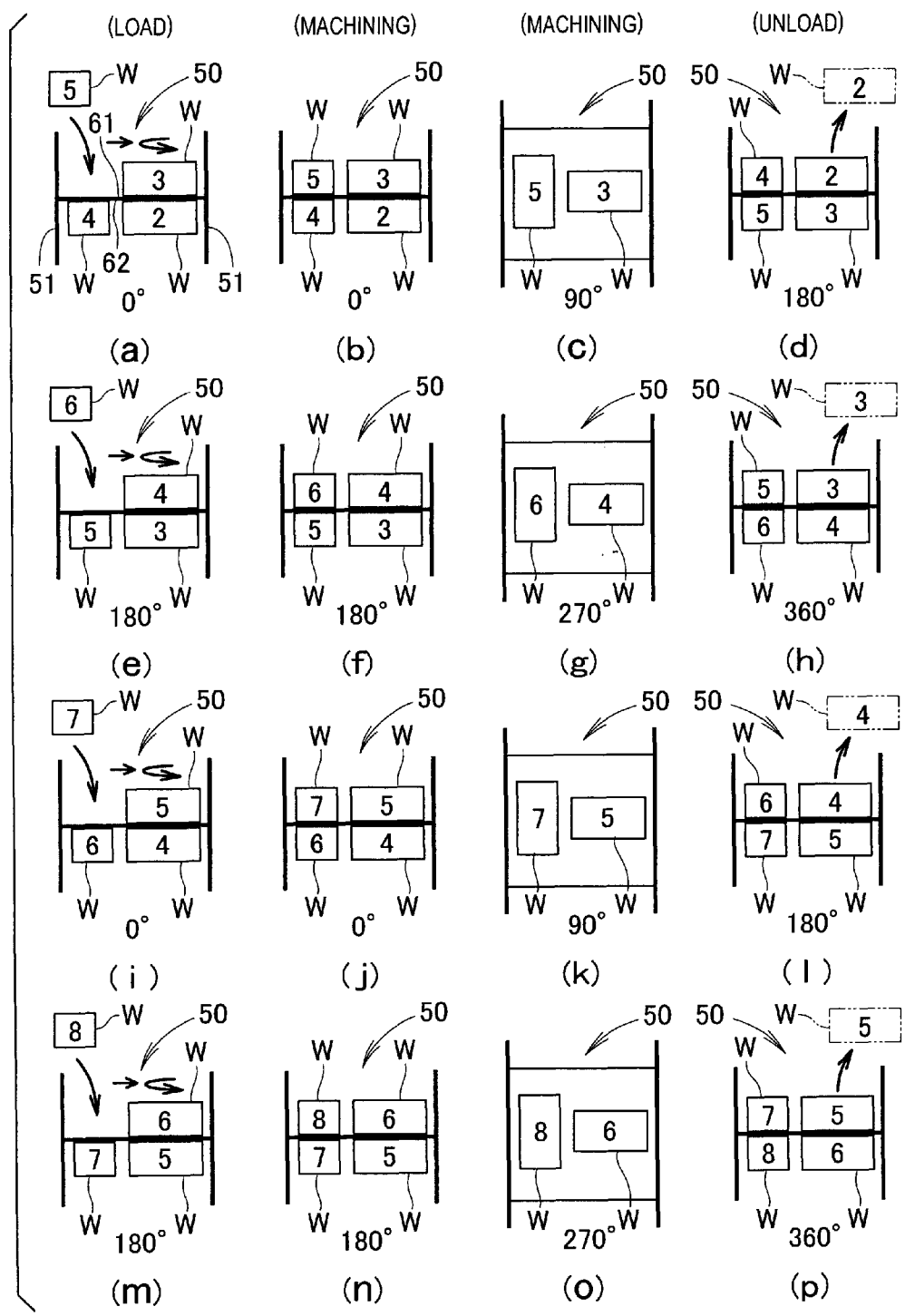
FIG. 8 is a view of a third step to a workpiece replacement step performed in the embodiment of the present invention.
Figure 9:
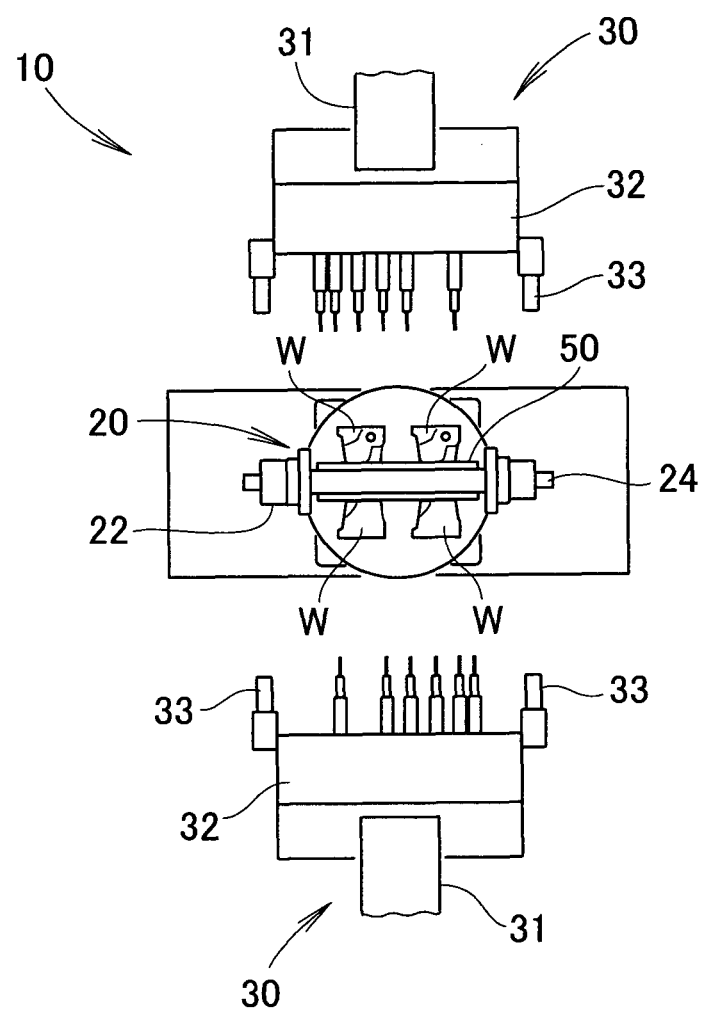
FIG. 9 is a plan view showing another embodiment of the workpiece machining jig of FIG. 1.

Now, a description will be given about operation of the machining apparatus 10 employing the above-described workpiece machining jig 50. FIGS. 7 and 8 are front views of the workpiece machining jig 50 taken in a direction from the multi-axis machining machine 30, where angles to be mentioned below in relation to various steps are absolute angles of the workpiece machining jig 50. As shown in FIG. 7, the workpiece machining jig 50 includes the flanges 51 and the pallets 61 and 62.

The machining apparatus 10 performs machining on the first to sixth surfaces of the workpiece W. The machining machine 30 includes: the workpiece machining jig 50 where two, left and right, workpieces W can be positioned or placed on one of opposite surfaces thereof (i.e., on one of the first and second pallets 61 and 62) along the rotation shaft 24 and other two, left and right, workpieces W can be positioned or placed on the other surface thereof (i.e., the other of the first and second pallets 61 and 62) along the rotation shaft 24; the rotation unit 22 for vertically rotating the workpiece machining jig 50 in one direction, through 90 degrees at a time, about the rotation shaft 24; and the multi-axis tools 32 for machining the workpieces W.

The transfer device 40 (FIG. 2) loads the first workpiece W (indicated by block "1" in FIG. 1) to a left position of the one surface of the workpiece machining jig 50 (i.e., left upper position of the workpiece machining jig 50) and clamps the first workpiece W ((a) of FIG. 7). The first surface, currently opposed to the multi-axis machining machine 30, of the first workpiece W is machined by any one of the multi-axis tools 32 of the multi-axis machining machine 30 ((b) of FIG. 7). Then, the workpiece machining jig 50 is vertically rotated through 90 degrees about the rotation shaft 24 so that the second surface of the first workpiece W is opposed to the multi-axis machining machine 30, and the second surface of the first workpiece W, currently opposed to the multi-axis machining machine 30, is machined by the multi-axis tool 32 ((c) of FIG. 7). Then, the workpiece machining jig 50 is further vertically rotated through 90 degrees about the rotation shaft 24 so that the first workpiece W is rotated to be located in a left lower position of the workpiece machining jig 50 ((d) of FIG. 7).

Then, the transfer device 40 (FIG. 2) loads the second workpiece W (indicated by block "2") to a left position of the other, currently upper, surface of the workpiece machining jig 50 (i.e., upper left position of the workpiece machining jig 50) and clamps the second workpiece W ((e) of FIG. 7). Then, the first surface of the second workpiece W located in the left upper position of the jig 50 and the third surface of the first workpiece W located in the left lower position of the jig 50, which are currently opposed to the multi-axis machining machine 30, are machined by the multi-axis tool 32 ((f) of FIG. 7). Then, the workpiece machining jig 50 is further vertically rotated through 90 degrees about the rotation shaft 24 so that the second surface of the second workpiece W is opposed to the multi-axis machining machine 30, and the second surface of the second workpiece W, currently opposed to the multi-axis machining machine 30, is machined by the multi-axis tool 32 ((g) of FIG. 7). Then, the workpiece machining jig 50 is further rotated through 90 degrees about the rotation shaft 24 so that the first workpiece W is located in the left upper position of the jig 50 and the second workpiece W is located in the lower-side position ((h) of FIG. 7).

Then, the first workpiece W is moved from the left to the right on the workpiece machining jig 50, horizontally rotated through 90 degrees about an axis intersecting the rotation shaft 24 and turned upside down ((i) of FIG. 7). Then, the transfer device 40 (FIG. 2) loads the third workpiece (indicated by block "3") W to the currently-empty left position of the one surface (on which the first workpiece W has previously been positioned), i.e. left upper position of the workpiece machining jig 50, and clamps the third workpiece W ((i) of FIG. 7). Then, the fourth surface of the first workpiece W, the third surface of the second workpiece W and the first surface of the third workpiece W, which are currently opposed to the multi-axis machining machine 30, are machined by the multi-axis tool 32 ((j) of FIG. 7). Further, the workpiece machining jig 50 is rotated through 90 degrees about the rotation shaft 24 so that the fifth surface of the first workpiece W and the second surface of the third workpiece W are opposed to the multi-axis machining machine 30, and the fifth surface of the first workpiece W and the second surface of the third workpiece W, currently opposed to the fifth surface of the first workpiece W and the second surface of the third workpiece W, are machined by the multi-axis tool 32 ((k) of FIG. 7). Then, the workpiece machining jig 50 is further rotated through 90 degrees about the rotation shaft 24 so that the first workpiece W is located in the right lower position, the second workpiece W is located in the left upper position and the third workpiece W is located in the left lower position ((l) of FIG. 7). At the next and subsequent steps, four workpieces W will always be clamped on the workpiece machining jig 50; such a state where four workpieces W are always placed on the workpiece machining jig 50 is referred to as a "steady state".

Then, the second workpiece W is moved from the left to the right on the workpiece machining jig 50, horizontally rotated through 90 degrees about the axis intersecting the rotation shaft 24 and turned upside down ((m) of FIG. 7). Then, the transfer device 40 loads the fourth workpiece (indicated by block "4") W to the currently-empty left position of the one surface (on which the second workpiece W has previously been positioned), i.e. left upper position of the workpiece machining jig 50, and clamps the fourth workpiece W ((m) of FIG. 7) (clamp step).

Then, the sixth surface of the first workpiece W, the fourth surface of the second workpiece W, the third surface of the third workpiece W and the first surface of the fourth workpiece W, which are currently opposed to the machining machine 30, are machined by the multi-axis tool 32 ((n) of FIG. 7) (first machining step).

Then, the workpiece machining jig 50 is further rotated through 90 degrees about the rotation shaft 24 so that the fifth surface of the second workpiece W and the second surface of the fourth workpiece W, currently opposed to the machining machine 30, are machined by the multi-axis tool 32 ((o) of FIG. 7) (second machining step).

Then, the workpiece machining jig 50 is further rotated through 90 degrees about the rotation shaft 24 so that the first workpiece W is located in the right upper position, the second workpiece W is located in the right lower position, the third workpiece W is located in the left upper position and the fourth workpiece W is located in the left lower position, and then the first workpiece W is unloaded ((p) of FIG. 7).

Then, the third workpiece W is moved from the left to the right on the workpiece machining jig 50, rotated through 90 degrees about the axis intersecting the rotation shaft 24 and turned upside down ((a) of FIG. 8). The transfer device 40 further loads the fifth workpiece (indicated by block "5") W to the currently-empty left position of the one surface (on which the third workpiece W has previously been positioned), i.e. left upper position of the workpiece machining jig 50, and clamps the third workpiece W ((a) of FIG. 8).

Then, the sixth surface of the second workpiece W, the fourth surface of the third workpiece W, the third surface of the fourth workpiece W and the first surface of the fifth workpiece W, which are currently opposed to the machining machine 30, are machined by the multi-axis tool 32 ((b) of FIG. 8) (third machining step).

Then, the workpiece machining jig 50 is further vertically rotated through 90 degrees about the rotation shaft 24 so that the fifth surface of the third workpiece W and the second surface of the fifth workpiece W are opposed to the machining machine 30, and these currently-opposed surfaces are machined by the multi-axis tool 32 ((c) of FIG. 8) (fourth machining step).

Then, the workpiece machining jig 50 is further vertically rotated through 90 degrees about the rotation shaft 24 so that the second workpiece W is located in the left upper position, the third workpiece W is located in the right lower position, the fourth workpiece W is located in the left upper position and the fifth workpiece W is located in the left lower position, and then the second workpiece W is unloaded ((d) of FIG. 8).

The fourth workpiece W is moved from the left to the right on the workpiece machining jig 50, rotated through 90 degrees about the axis intersecting the rotation shaft 24 and turned upside down ((e) of FIG. 8). The transfer device 40 further loads the sixth workpiece (indicated by block "6") W to the currently-empty left position of the one surface (on which the fourth workpiece W has previously been positioned), i.e. left upper position of the workpiece machining jig 50, and clamps the sixth workpiece W ((e) of FIG. 8) (workpiece replacement step).

After that, the aforementioned clamp step, first machining step, second machining step, third machining step, fourth machining step and workpiece replacement step are repeated as shown in (f) to (p) of FIG. 8. In the aforementioned manner, four workpieces W are machined concurrently using the single workpiece machining jig.

The embodiment of the workpiece machining method of the present invention has been described above in relation to the case where the workpieces W are horizontally rotated through 90 degrees about the axis intersecting the rotation shaft 24 and then turned upside down following the horizontal 90-degree rotation about the axis intersecting the rotation shaft 24. However, the workpieces W may need not be turned upside down, depending on the type of the workpieces or the like. In such a case, the second surface of any of the workpieces W may be machined twice without the fifth surface of the workpiece W being machined after that. Namely, even where the second surface of the fourth workpiece W has many portions to be machined (i.e., machining portions), the present invention can machine the many machining portions of the second surface by just changing the machining portion to another in the second machining of the second surface. In addition, where the workpieces W need not be turned upside down depending on the type of the workpieces or the like, there is no need to provide the vertically turning mechanism 45 (see FIG. 2) in the transfer device 40, and thus the transfer device 40 can be significantly simplified in construction. As a result, the present invention can reduce the cost of the transfer device 40. In addition, because the workpiece W need not be turned upside down, the present invention can reduce the number of necessary steps and thereby achieve an enhanced productivity.

Further, the clamp device 20 is not limited to the construction described above in relation to the preferred embodiment, and the clamp device 20 may be of a conventionally-known construction as long as the clamp device 20 can rotate the workpiece machining jig 50 in one direction. Further, the multi-axis machining machine 30 is not limited to the construction described above in relation to the preferred embodiment, and the multi-axis machining machine 30 may be of a conventionally-known construction as long as it includes multi-axis tools such that four workpieces can be machined concurrently at any given time. Furthermore, the transfer device 40 is not limited to the construction described above in relation to the preferred embodiment, and the transfer device 40 may be of a conventionally-known construction as long as it can transfer a workpiece W.

Furthermore, whereas the embodiment has been described above in relation to the case where the workpiece machining jig 50 employs the first and second pallets 61 and 62, these first and second pallets 61 and 62 may be replaced with a single pallet, in which case two workpieces W are placed or positioned on one of the opposite surfaces of the single pallet while other two workpieces W are placed or positioned on the other of the opposite surfaces of the single pallet.

Finally, the workpiece machining method and jig of the present invention are well suited for application to workpiece machining techniques for machining workpieces by means of a multi-axis machining machine.

What is claimed is:

1. A workpiece machining method for machining four workpieces by means of a multi-axis machining machine, comprising:

a clamp step of positioning the four work pieces on a horizontal pallet, two workpieces of the four workpieces on one surface of the pallet of opposite surfaces of the pallet and other two workpieces of the four workpieces on other surface of the pallet of the opposite surfaces of the pallet, with the opposite surfaces of the pallet oriented upward and downward respectively, and clamping all of the workpieces in such a manner that all of the four workpieces are opposed to the multi-axis machining machine;

a first machining step of machining respective surfaces, currently opposed to the multi-axis machining machine, of the four workpieces;

a second machining step of rotating the pallet through 90 degrees so that the two workpieces positioned on the one surface of the pallet are opposed to the multi-axis machining machine, and machining respective surfaces, currently opposed to the multi-axis machining machine, of the two workpieces positioned on the one surface of the pallet;

a third machining step of further rotating the pallet through 90 degrees and machining respective surfaces, currently opposed to the multi-axis machining machine, of the four workpieces;

a fourth machining step of further rotating the pallet through 90 degrees so that the two workpieces positioned on the other surface of the pallet are opposed to the multi-axis machining machine, and machining respective surfaces, currently opposed to the multi-axis machining machine, of the two workpieces positioned on the other surface of the pallet; and a workpiece replacement step of further rotating the pallet through 90 degrees and causing a transfer device to unload from the pallet one of the two workpieces positioned on the one surface of the pallet, translate other of the two workpieces remaining on the one surface of the pallet to a position on the one surface of the pallet on which the one of the workpieces unloaded has previously been positioned, and position a new workpiece on a position on the one surface of the pallet on which the other of the two workpieces translated has previously been positioned, wherein, at all times during the first machining step, the second machining step, the third machining step, and the fourth machining step, four different workpieces are positioned on the pallet, so that four different workpieces are machined concurrently, by repetition of the clamp step, the first machining step, the second machining step, the third machining step, the fourth machining step and the workpiece replacement step.

* * * * *